United States Patent
Bennett

(10) Patent No.: US 7,337,696 B2
(45) Date of Patent: Mar. 4, 2008

(54) TWO-SPEED TRANSFER CASE WITH INTEGRATED DECLUTCH

(75) Inventor: John L. Bennett, Fraser, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 146 days.

(21) Appl. No.: 11/302,024

(22) Filed: Dec. 13, 2005

(65) Prior Publication Data

US 2007/0131045 A1    Jun. 14, 2007

(51) Int. Cl.
*F16H 3/085* (2006.01)
*F16H 3/089* (2006.01)

(52) U.S. Cl. .................. 74/665 F; 74/665 T
(58) Field of Classification Search ........... 74/665 F, 74/665 T; 475/198
See application file for complete search history.

(56) References Cited

U.S. PATENT DOCUMENTS 4,040,309 A * 8/1977 Wood et al. .............. 74/665 T
4,913,960 A * 4/1990 Kuroda et al. .............. 428/345

* cited by examiner

Primary Examiner—Sherry Estremsky
Assistant Examiner—Edwin A Young
(74) Attorney, Agent, or Firm—Carlson, Gaskey & Olds

(57) ABSTRACT

A two-speed transfer case includes an input shaft that is driven by a vehicle engine, a first output shaft that is coupled to a rear axle, and a second output shaft that is coupled to a front axle. The transfer case also includes a high range gear set and a low range gear set. The high range gear set includes a first gear supported on the input shaft and a second gear supported on the first output shaft. The low range gear set includes a third gear supported on the input shaft and a fourth gear supported on the second output shaft. A shifting mechanism cooperates with the second and fourth gears and the first and second output shafts to provide a plurality of operational output configurations. The shifting mechanism is integrated into a housing that substantially encloses the input shaft and the first and second output shafts.

20 Claims, 3 Drawing Sheets

TWO-SPEED TRANSFER CASE WITH INTEGRATED DECLUTCH

TECHNICAL FIELD

The subject invention relates to a two-speed transfer case with an integrated declutch that reduces standout.

BACKGROUND OF THE INVENTION

A transfer case includes an input that transfers power from a vehicle engine to at least two different outputs. Typically, the transfer case includes one output for driving a rear drive axle and another output for diving a front drive axle. The transfer case also includes a declutch assembly that allows one of the first and second outputs, typically the output for the front drive axle, to be selectively disengaged from the input.

Transfer cases can have various configurations, including a two-speed configuration in which a user can select between a high range of operation and a low range of operation. For this type of transfer case, the declutch assembly includes independent shift mechanisms to engage the high and low ranges, and to engage and disengage one of the first and second outputs. This configuration requires a significant number of components, which accordingly increases cost and assembly time.

Further, this declutch assembly has a bolt-on attachment interface to the transfer case. Typically, the transfer case includes a two-piece housing. A declutch housing that encloses the declutch assembly is bolted onto an external portion of one housing piece, and includes an output yoke that is coupled to one of the front and rear drive axles. Another output yoke extends outwardly from the other housing piece opposite from the output yoke associated with the declutch assembly.

The distance between these two opposing output yokes is defined as "standout." Conventional two-speed transfer cases have a long stand-out due to the bolt-on attachment interface of the declutch assembly. Long stand-outs are disadvantageous because the overall packaging envelope for the transfer case is increased, which decreases the amount of packaging space available for other driveline components.

Thus, there is a need for a more compact and cost-effective transfer case configuration.

SUMMARY OF THE INVENTION

A two-speed transfer case includes an input shaft, first and second output shafts, and high and low range gear sets that provide a plurality of different operational output configurations. The input shaft, first and second output shafts, and high and low range gear sets are substantially enclosed within a transfer case housing. A shifting mechanism is also positioned within the transfer case housing to provide a compact assembly with reduced standout.

The high range gear set includes a first gear supported on the input shaft and a second gear supported on the first output shaft. The low range gear set includes a third gear supported on the input shaft and a fourth gear supported on the second output shaft. The first and second gears are in direct meshing engagement with each other, and the third and fourth gears are in direct meshing engagement with each other.

A first bearing rotatably supports the second gear on the first output shaft and a second bearing rotatably supports the fourth gear on the second output shaft. Further, first and second pairs of tapered roller bearings support the first and second output shafts, respectively for rotation relative to the transfer case housing. The high and low range gear sets are both positioned axially between the first pair of tapered roller bearings and the second pair of tapered roller bearings. The shifting mechanism is positioned within an internal cavity of the transfer case housing at a position between the high and low range gear sets.

The shifting mechanism includes a shift collar that moves axially between different engagement positions to provide the plurality of different operational output configurations. The shift collar is movable to provide a high speed rear wheel drive output configuration, a high speed all wheel drive output configuration, a low speed all wheel drive output configuration, and a neutral output configuration.

The subject two-speed transfer case with an integrated shifting mechanism provides a more compact and cost effective design configuration when compared to traditional designs. These and other features of the present invention can be best understood from the following specification and drawings, the following of which is a brief description.

DETAILED DESCRIPTION OF THE PREFERRED EMBODIMENT

Figure 2:
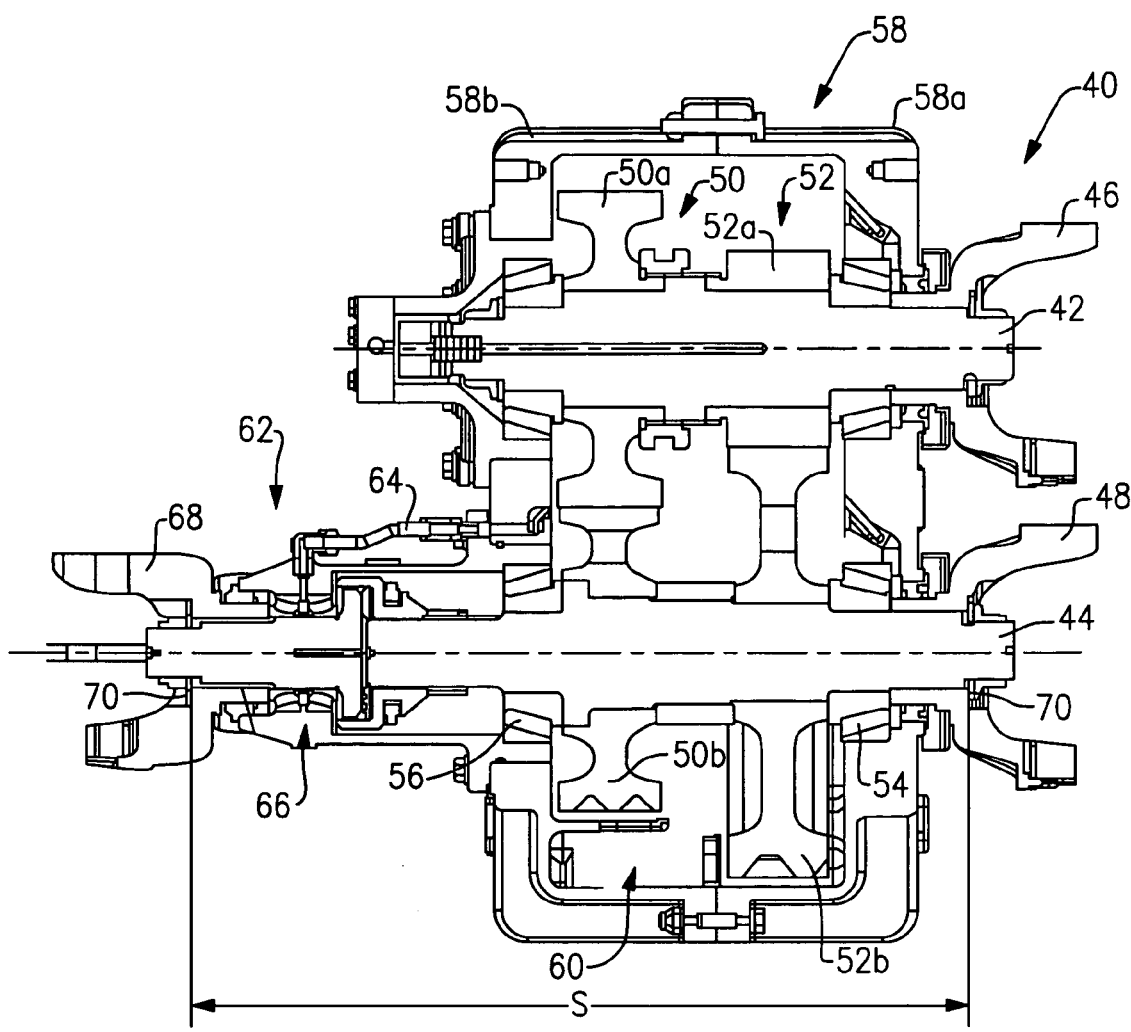
FIG. 2 is a cross-sectional side view of a prior art transfer case.

A transfer case 10 includes an input 12 that is coupled to a power source 14. The power source 14 can be an internal combustion engine, electric motor, hydraulic motor, or any other type of power source, The transfer case 10 includes a first output 16 that is coupled to a first drive member 18, and a second output 20 that is coupled to a second drive member 22. In one example, the first 18 and second 22 drive members comprise drive axles as shown, however, the first 16 and second 20 outputs could also be used to drive other types of drive members.

In the example shown, the input 12 comprises a rear input, the first drive member 18 comprises a rear drive axle 24, and the second drive member 22 comprises a front drive axle 26. The rear 24 and front 26 drive axles each include a carrier 28, a pair of axle shafts 30 driven by the carrier 28, and a pair of wheels 32 driven by the pair of axle shafts 30. It should be understood that while a rear input configuration is shown, the subject transfer case 10 could also be used with a front input configuration. The transfer case 10 is used to selectively provide all wheel drive output under different speed conditions, a single axle drive output, or a neutral drive output configuration.

An example of a traditional transfer case assembly 40 is shown in FIG. 2. The transfer case assembly 40 includes an input shaft 42 and an output shaft 44. The input shaft 42 includes a first yoke member 46 that is coupled to a mating yoke member supported on a drive shaft (not shown). The output shaft 44 includes a second yoke member 48 that is coupled to a mating yoke member on a rear axle (not shown).

The traditional transfer case assembly 40 includes a high range gear set 50 and a low range gear set 52. In the example configuration shown, the high range gear set 50 includes a first gear 50a supported on the input shaft 42 and a second gear 50b supported on the output shaft 44. The low range gear set 52 includes a first gear 52a supported on the input shaft 42 and a second gear 52b supported on the output shaft 44. Thus, the high range gear set 50 is associated with the front output (LH side) and the low range gear set 52 is associated with the rear output (RH side). As known, the positions of the high 50 and low 52 range gear sets could also be reversed with the high range gear set 50 being associated with the rear output and the low range gear set 52 being associated with the front output. The relative position of the high 50 and low 52 range gear sets are determined based on vehicle application and desired drive configuration.

The output shaft 44 is a single piece shaft that supports both of the second gears 50b, 52b. The output shaft 44 is supported by first 54 and second 56 bearings. The second gears 50b, 52b are positioned on the output shaft 44 between the first 54 and second 56 bearings.

The transfer case assembly 40 includes a housing 58 having first 58a and second 58b housing portions that cooperate to define an internal cavity 60. The input shaft 42, the output shaft 44, the first gears 50a, 50b, and the second gears 50b, 52b are positioned within the internal cavity 60.

The transfer case assembly 40 includes a declutch assembly 62 that is separately fastened to the housing 58. The declutch assembly 62 includes a housing 64, a clutch mechanism 66, and a third yoke member 68 that is coupled to a mating yoke member on a front axle (not shown). The housing 64 encloses the clutch mechanism 66 and is bolted onto an exterior surface of the second housing portion 58b. The declutch assembly 62 includes independent shift mechanisms to engage the high and low range gear sets, and to engage and disengage the front axle output as known. Operation of the declutch assembly 62 is well known and will not be discussed in detail.

Each of the second 48 and third 68 yoke members includes an end face 70. The distance between these end faces 70 is defined as "standout S." Due to the bolt-on declutch configuration, traditional transfer case assemblies 40 have a long standout S, which is undesirable. In additional to increasing standout, the declutch assembly 62 is comprised of a significant number of components, which disadvantageously increases cost and assembly time.

Figure 3:
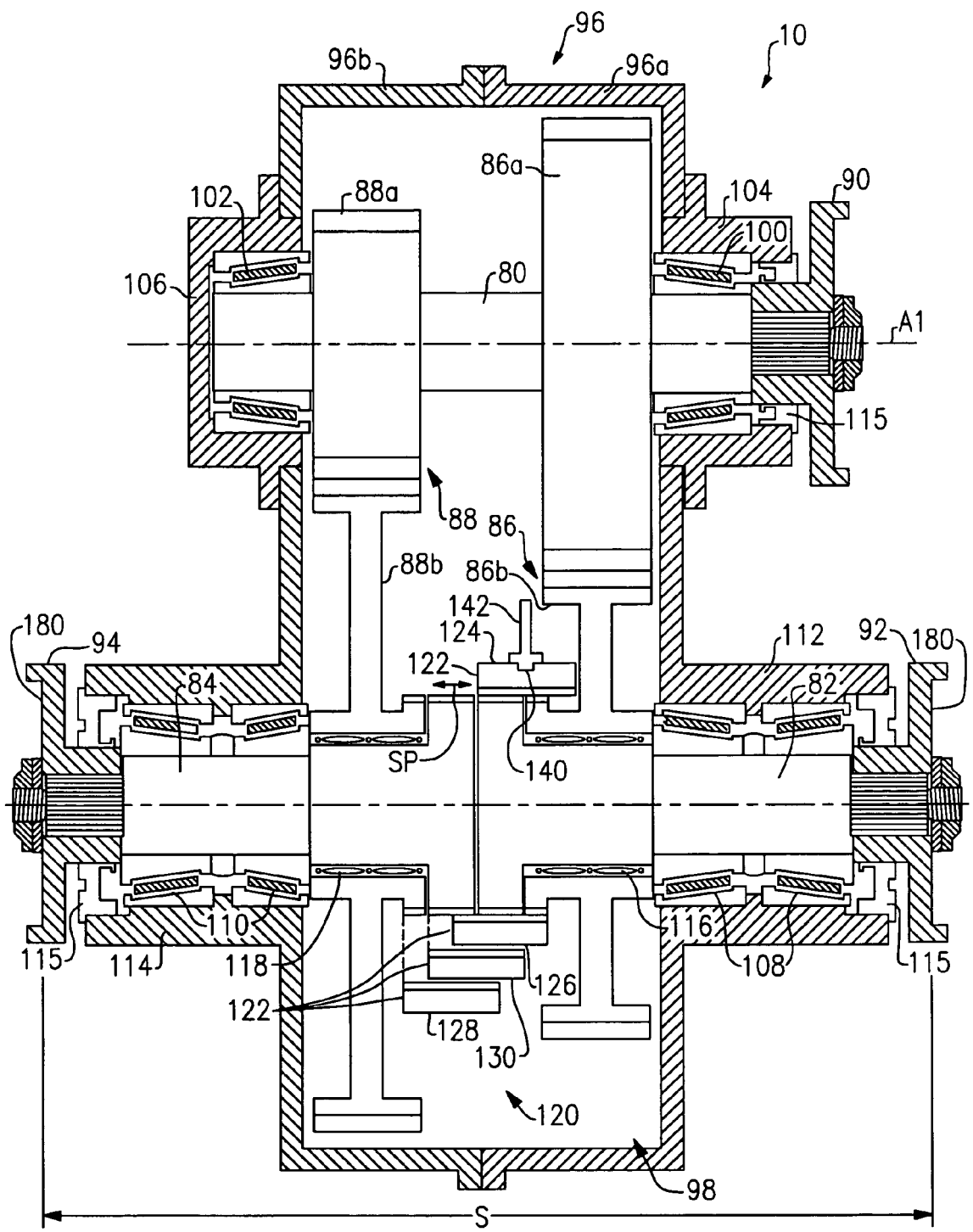
FIG. 3 is a cross-sectional side view of a transfer case incorporating the subject invention.

The transfer case 10 designed according to the present invention is shown in greater detail in FIG. 3. This transfer case 10 is uniquely configured to reduce standout and provide a more compact and cost-effective design when compared to traditional configurations.

The transfer case 10 includes an input shaft 80, a first output shaft 82, and a second output shaft 84 that is separate from the first output shaft 82. The transfer case includes a high range gear set 86 and a low range gear set 88. The high range gear set 86 includes a first gear 86a fixed for rotation with the input shaft 80, and a second gear 86b supported on the first output shaft 82. The low range gear set 88 includes a third gear 88a fixed for rotation with the input shaft 80, and a fourth gear 88b supported on the second output shaft 84. The first 86a and second 86b gears are in direct meshing engagement with each other and the third 88a and fourth 88b gears are in direct meshing engagement with each other.

The first 86a and third 88a gears, and the input shaft 80, are fixed for rotation about an input axis A1 defined by the input shaft 80. The first 86a and third 88a gears, and the input shaft 80 can be formed as separate pieces, or can be integrally formed as a single piece component.

Figure 1:
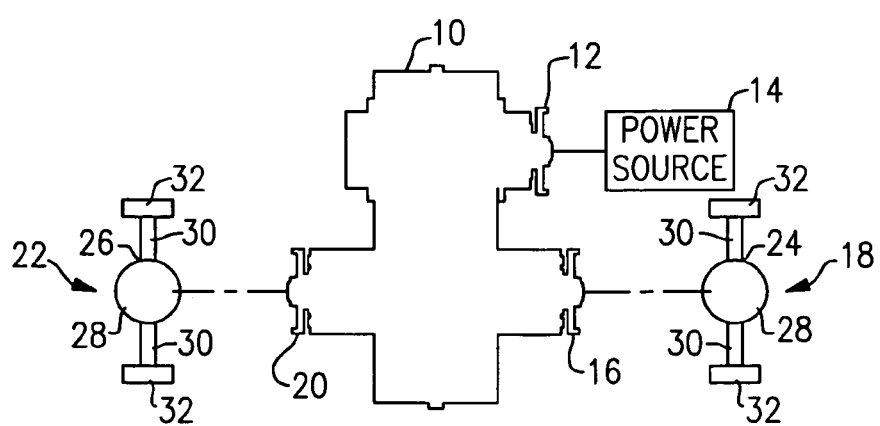
FIG. 1 is a schematic view of a driveline with a transfer case incorporating the subject invention.

The input shaft 80 includes a first yoke member 90 that is coupled to a mating yoke member supported on a drive shaft (not shown). The first output shaft 82 includes a second yoke member 92 that is coupled to a mating yoke member on the rear drive axle 24 (FIG. 1). The second output shaft 84 includes a third yoke member 94 that is coupled to a mating yoke member on the front drive axle 26 (FIG. 1). It should be understood that in the configuration shown, the transfer case 10 comprises a rear input configuration for a rear engine drive, however the transfer case 10 could also be used for a front input configuration.

The transfer case 10 includes a housing 96 that is comprised of a first housing portion 96a and a second housing portion 96b that cooperate with each other to define an internal cavity 98. The input shaft 80, first 82 and second 84 output shafts, and the high 86 and low 88 range gear sets are substantially enclosed within the internal cavity 98 by the first 96a and second 96b housing portions.

A first bearing 100 supports one end of the input shaft 80 and a second bearing 102 supports an opposite end of the input shaft 80. The first bearing 100 is supported in a first bearing cage 104 mounted to the first housing portion 96a and the second bearing 102 is supported in a second bearing cage 106 mounted to the second housing portion 96b.

The first output shaft 82 is supported on a first pair of bearings 108 and the second output shaft 84 is supported on a second pair of bearings 110. The first pair of bearings 108 is positioned directly between the first housing portion 96a and the first output shaft 82. The second pair of bearings 110 is positioned directly between the second housing portion 96b and the second output shaft 84. No other bearings are required to support the first 82 and second 84 output shafts.

In one example, the first 108 and second 110 pairs of bearings are tapered roller bearings. The first housing portion 96a includes a first extension portion 112 to support the first pair of bearings 108 and the second housing portion 96b includes a second extension portion 114 to support the second pair of bearings 110. The second 86b and fourth 88b gears are positioned on the first 82 and second 84 output shafts at a position that is axially between the first 108 and second 110 pairs of bearings. The second 86b and fourth 88b gears, and the first 82 and second 84 output shafts, are located within the internal cavity 98. The first 108 and second 110 pairs of bearings, the first 82 and second 84 output shafts, and the second 86b and fourth 88b gears are concentric with an axis of rotation A2 defined by the first 82 and second 84 output shafts.

The transfer case 10 includes a plurality of seals 115 that are used to protect the first 100 and second 102 bearings, and to protect the first 108 and second 110 pairs of bearings. At least one of these seals 115 is positioned to engage each of the first 90, second 92, and third 94 yoke members.

A third bearing 116 rotatably supports the second gear 86b on the first output shaft 82. A fourth bearing 118 rotatably supports the fourth gear 88b on the second output shaft 84. In one example, the third bearing 116 is positioned directly between the second gear 86b and the first output shaft 82, and the fourth bearing 118 is positioned directly between the fourth gear 88b and the second output shaft 84. In another example, the third 116 and fourth 118 bearings comprise needle bearings.

The transfer case 10 includes a shifting mechanism, shown generally at 120, that is movable between a plurality of different operational positions. In one example, the shifting mechanism 120 provides a high speed rear wheel drive output configuration, a high speed all wheel drive output configuration, a low speed all wheel drive output configuration, and a neutral output configuration. The shifting mechanism 120 includes a shift collar 122 that is selectively moved in a generally linear direction along the axis of rotation A2 between the different operational positions.

The shift collar 122 is shown in multiple different positions in FIG. 3. As indicated at 124, the shift collar 122 is in a high speed rear wheel drive output configuration. As indicated at 126, the shift collar 122 is in a high speed all wheel drive output configuration. As indicated at 128, the shift collar 122 is a low speed all wheel drive output configuration. As indicated at 130, the shift collar 122 is in a neutral output configuration.

Please note that in each of these different operational positions, the shift collar 122 is generally located at a radial position from the first 82 and second 84 output shafts as indicated at 124, and is then moved axially along a shift path indicated by arrow SP to other axial positions for each of the other operational positions. The shift collar 122 is shown below and radially spaced from the first 82 and second 84 output shafts in each of the positions 126, 128, 130 only for clarity purposes and does not represent the actual radial position of the shift collar 122 in these positions 126, 128, 130. However, in FIG. 3, each shift collar 122 is shown in an actual axial position along shift path SP for the corresponding operational position.

The shift collar 122 couples the second gear 86b to the first output shaft 82, as indicated at 124, to provide the high speed rear wheel drive output configuration. When in this configuration, the first gear 86a on the input shaft 80 drives the second gear 86b, which drives the first output shaft 82 to provide high speed output to the rear drive axle 24. The third gear 88a drives the fourth gear 88b, but the fourth gear just spins on the second output shaft 84 via the fourth bearing 118 because there is nothing that couples the fourth gear 88b to the first output shaft 82. Thus, no driving output is provided to the front drive axle 26 in this operational position.

The shift collar 122 couples the second gear 86b, the first output shaft 82, and the second output shaft 84 together, as indicated at 126, to provide the high speed all wheel drive output configuration. When in this operational position, the second gear 86b, the first output shaft 82, and the second output shaft 84 are all fixed to rotate together about the axis of rotation A2. The first gear 86a drives the second gear 86b, which drives the first output shaft 82 to provide high speed output to the rear drive axle 24. The first output shaft 82 drives the second output shaft 84 due to the coupling of the shift collar 122. Again, the third gear 88a drives the fourth gear 88b, but the fourth gear just spins on the second output shaft 84 via the fourth bearing 118 because nothing has coupled the fourth gear 88b to the second output shaft 84.

The shift collar 122 couples the fourth gear 88b, the first output shaft 82, and the second output shaft 84 together, as indicated at 128, provide the low speed all wheel drive output configuration. When in this operational position, the fourth gear 88b, the first output shaft 82, and the second output shaft 84 are all fixed to rotate together about the axis of rotation A2. The third gear 88a drives the fourth gear 88b, which drives the second output shaft 84 to provide low speed output to the front drive axle 26. The second output shaft 84 drives the first output shaft 82 due to the coupling of the shift collar 122. The first gear 86a drives the second gear 86b, but the second gear 86b just spins on the first output shaft 82 via the third bearing 116 because nothing has coupled the second gear 86b to the first output shaft 82.

The shift collar 122 couples only the first 82 and second 84 output shafts together, as indicated at 130, to provide the neutral output configuration. When in the neutral output configuration, the first gear 86a drives the second gear 86b, but the second gear 86b just spins on the first output shaft 82 via the third bearing 116 because nothing has coupled the second gear 86b to the first output shaft 82. The third gear 88a drives the fourth gear 88b, but the fourth gear 88b just spins on the second output shaft 84 via the fourth bearing 118 because nothing has coupled the fourth gear 88b to the second output shaft 84. Thus, the input shaft 80, and the first 86a, second 86b, third 88a, and fourth 88b gears are all spinning while the first 82 and second 84 output shafts are stationary.

Figure 4:
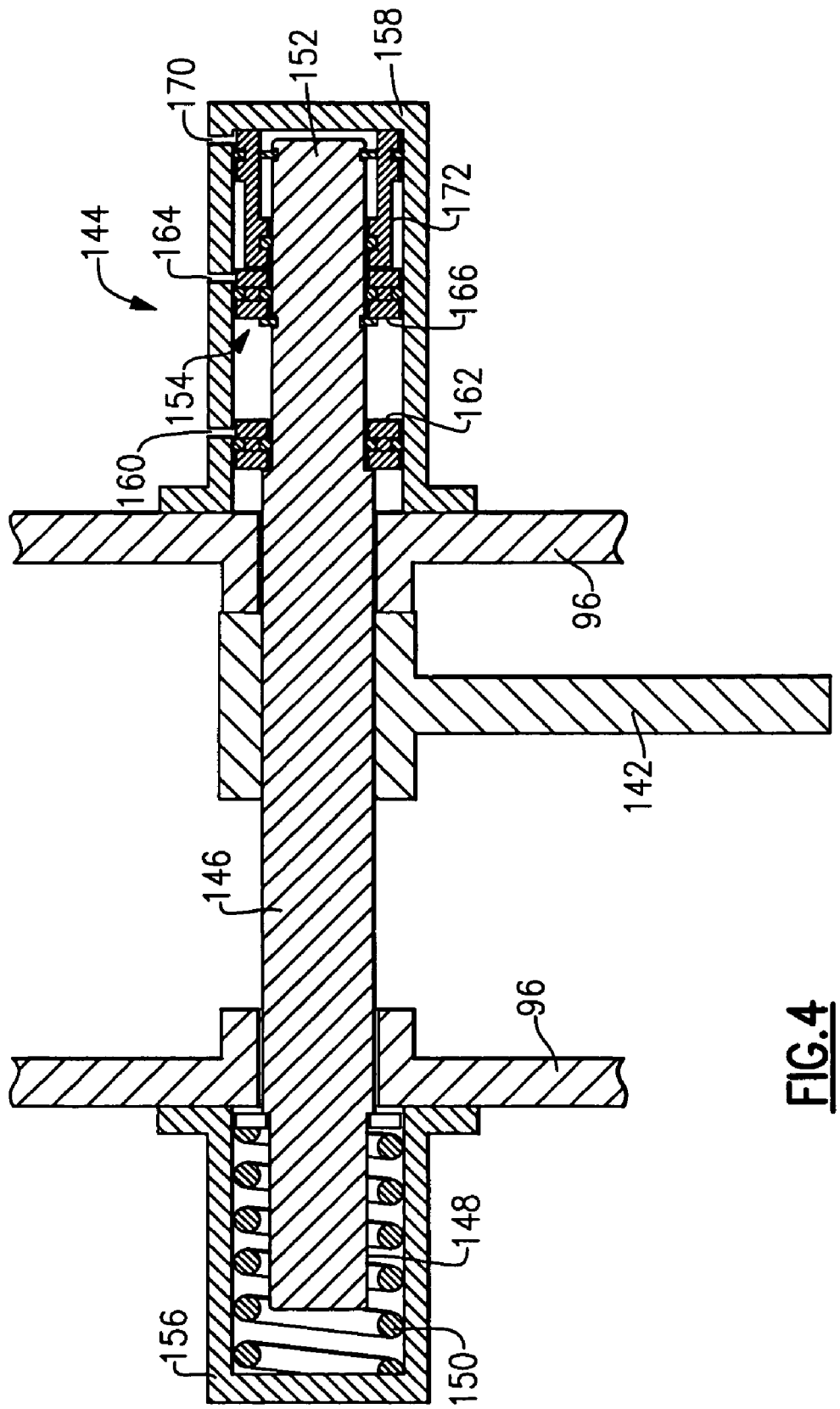
FIG. 4 is a schematic representation of an actuator for a shifting mechanism as used in the transfer case of FIG. 3.

The shift collar 122 includes a groove 140 (only shown in the shift collar 122 at position 124) that receives a shift fork 142. As shown in FIG. 4, an actuator 144 is coupled to move the shift fork 142 between the different operational positions. In one example, the actuator 144 is pneumatically controlled as described below, however, other types of actuators could also be used to move the shift fork 142. The actuator 144 is selectively moved between the different operational positions by a user or can be electronically controlled by a system controller (not shown) in response to sensed vehicle conditions.

The shift fork 142 is fixed to a shift shaft 146. The shift shaft 146 has a first end 148 that reacts against a spring 150, and a second end 152 that is coupled to a piston assembly 154. The actuator 144 includes a first housing portion 156 that receives the spring 150, and a second housing portion 158 that receives the piston assembly 154. The second housing portion 158 comprises a cylinder that slidably receives the piston assembly 154. The first 156 and second 158 housing portions are mounted to the housing 96 for the transfer case 10.

The spring 150 resiliently biases the shift fork 142 to move the shift collar 122 to the high speed rear wheel drive output configuration indicated at 124 in FIG. 3. To move the shift collar to the high speed all wheel drive output configuration (position 126 in FIG. 3), a first port 160 in the second housing portion 158 is pressurized to move a first piston member 162 of the piston assembly 154. Sufficient pressure is provided by an air source (not shown) to overcome the bias of the spring 150. The first piston member 162 is fixed to move the shift shaft 146, which in turn moves the shift fork 142 and shift collar 122.

To move the shift collar 122 to the neutral output configuration (position 130 in FIG. 3), a second port 164 is pressurized to move a second piston member 166 of the piston assembly 154. Again, sufficient pressure is provided to overcome the bias of the spring 150. The second piston member 166 is fixed to move the shift shaft 146, which in turn moves the shift fork 142 and shift collar 122.

To move the shift collar 122 to the low speed all wheel drive output configuration (position 128 in FIG. 3), a third port 170 is pressurized to move a third piston member 172 of the piston assembly 154. Sufficient pressure is provided to compress the spring 150. Movement of the third piston member 172 results in corresponding movement of the shift shaft 146, shift fork 142, and shift collar 122. In any of the pressurized positions, when air pressure is vented, the bias of the spring 150 returns the shift shaft 146, shift fork 142, and shift collar 122 to the high speed rear wheel drive output configuration.

The subject invention provides a transfer case 10 that integrates a shifting and declutch mechanism into the transfer case itself, which eliminates a significant number of parts and their associate weights and costs. Further, by incorporating the shifting and declutch mechanism into the transfer case housing, the standout S between end faces 180 of the opposing second 92 and third 94 yoke members (FIG. 3) is significantly reduced when compared to traditional configurations, such as that shown in FIG. 2, and thus provides a more compact design.

Further, in the configuration shown in FIG. 3, there is no low speed rear wheel drive output configuration. Typically, this output configuration is not desirable, as this output configuration is not usually selected by a user under appropriate driving conditions. When such an output configuration was inappropriately selected with a traditional transfer case assembly, such as that shown in FIG. 2, the result was often premature wear and failure of various internal transfer case components. Thus, the subject invention provides the additional benefit of not allowing such a configuration to be selected.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A transfer case assembly comprising:
an input shaft;
a first output shaft driven by said input shaft;
a second output shaft driven by said input shaft, said second output shaft being separate from said first input shaft;
a high range gear set interacting between said input shaft and one of said first and said second output shafts;
a low range gear set interacting between said input shaft and the other of said first and said second output shafts; and
a shifting mechanism cooperating with said first and said second output shafts to provide a plurality of operational output configurations.

2. The transfer case assembly according to claim 1 including first and second gears supported on said input shaft, a third gear supported on said first output shaft and in meshing engagement with said first gear, and a fourth gear supported on said second output shaft and in meshing engagement with said second gear, wherein said first and said third gears comprise said high range gear set, and said second and said fourth gears comprise said low range gear set.

3. The transfer case assembly according to claim 2 including a first bearing positioned directly between said third gear and said first output shaft, and a second bearing positioned directly between said fourth gear and said second output shaft.

4. The transfer case assembly according to claim 2 wherein said plurality of operational output positions includes at least a high speed single output drive configuration where said shifting mechanism is positioned to fix said third gear for rotation with said first output shaft.

5. The transfer case assembly according to claim 2 wherein said plurality of operational output positions includes at least a high speed all wheel drive configuration where said shifting mechanism is positioned to couple both of said first and said second output shafts for rotation with said third gear.

6. The transfer case assembly according to claim 2 wherein said plurality of operational output positions includes at least a low speed all wheel drive configuration where said shifting mechanism is positioned to couple both of said first and said second output shafts for rotation with said fourth gear.

7. The transfer case assembly according to claim 2 wherein said plurality of operational output positions includes at least a neutral configuration where said shifting mechanism is positioned to couple only said first and said second output shafts together such that said third and said fourth gears rotate freely on a respective one of said first and said second output shafts without transmitting power to said first and said second output shafts.

8. The transfer case assembly according to claim 1 including a housing having a first housing portion and a second housing portion, a first bearing set supporting said first output shaft for rotation relative to said first housing portion, and a second bearing set supporting said second output shaft for rotation relative to said second housing portion.

9. The transfer case assembly according to claim 8 wherein each of said first and said second bearing sets is solely comprised of a pair of tapered roller bearings.

10. The transfer case assembly according to claim 1 wherein said first and said second output shafts are separate components that are identical to each other.

11. The transfer case assembly according to claim 1 wherein said shifting mechanism comprises at least a shift collar, a shift fork coupled to said shift collar, and an actuator that controls movement of said shift fork.

12. The transfer case assembly according to claim 1 wherein said shifting mechanism is positioned axially between said high range gear set and said low range gear set.

13. A transfer case assembly comprising:
a housing including a first portion and a second portion that cooperate to define an internal cavity;
an input shaft positioned within said internal cavity, said input shaft including structure adapted to receive input from a vehicle power source;
a first output shaft positioned within said internal cavity, said first output shaft including structure adapted to transmit power from said input shaft to a first drive output;
a second output shaft positioned within said internal cavity, said second output shaft including structure adapted to transmit power from said input shaft to a second drive output; and
a shifting mechanism positioned within said internal cavity, said shifting mechanism including a shift collar that is concentric with said first and said second output shafts, and said shifting mechanism cooperating with said first and said second output shafts to provide a plurality of operational output configurations.

14. The transfer case assembly according to claim 13 including a first bearing set positioned directly between said first housing portion and said first output shaft and a second bearing set positioned directly between said second housing portion and said second output shaft wherein each of said first and said second bearing sets comprises a pair of tapered roller bearings.

15. The transfer case assembly according to claim 13 wherein said shifting mechanism includes a shift fork coupled to said shift collar and an actuator that selectively actuates said shift fork to provide a desired one of the plurality of operational output configurations.

16. A transfer case assembly comprising:
a housing including a first portion and a second portion that cooperate to define an internal cavity;

an input shaft positioned within said internal cavity, said input shaft including structure adapted to receive input from a vehicle power source;

a first output shaft positioned within said internal cavity, said first output shaft including structure adapted to transmit power from said input shaft to a first drive output;

a second output shaft positioned within said internal cavity, said second output shaft including structure adapted to transmit power from said input shaft to a second drive output;

a shifting mechanism positioned within said internal cavity, said shifting mechanism cooperating with said first and said second output shafts to provide a plurality of operational output configurations;

a high range gear set comprising a first gear supported on said input shaft and a second gear supported on said first output shaft; and a low range gear set comprising a third gear supported on said input shaft and a fourth gear supported on said second output shaft wherein said first gear is in direct meshing engagement with said second gear and said third gear is in direct meshing engagement with said fourth gear.

17. The transfer case assembly according to claim 16 wherein said shifting mechanism is completely enclosed within said internal cavity by said first and said second housing portions.

18. The transfer case assembly according to claim 17 wherein said shifting mechanism comprises at least a shift collar, a shift fork coupled to said shift collar, and an actuator that controls movement of said shift fork.

19. The transfer case assembly according to claim 16 wherein the first drive output comprises a rear axle drive output and the second drive output comprises a front axle drive output and wherein said plurality of operational output configurations includes:

a high speed rear wheel drive output wherein said shifting mechanism couples only said second gear and said first output shaft for rotation together;

a high speed all wheel drive output wherein said shifting mechanism couples said second gear, said first output shaft, and said second output shaft for rotation together;

a neutral output wherein said shifting mechanism fixes only said first and said second output shafts together; and a low speed all wheel drive output wherein said shifting mechanism couples said fourth gear, said first output shaft, and said second output shaft for rotation together.

20. The transfer case assembly according to claim 19 including a first bearing supporting said second gear for rotation relative to said first output shaft and a second bearing supporting said fourth gear for rotation relative to said second output shaft.

* * * * *